Sept. 10, 1968   L. A. WORSHAM   3,400,480
AUTOMATIC FISHING GUN
Filed Oct. 22, 1965
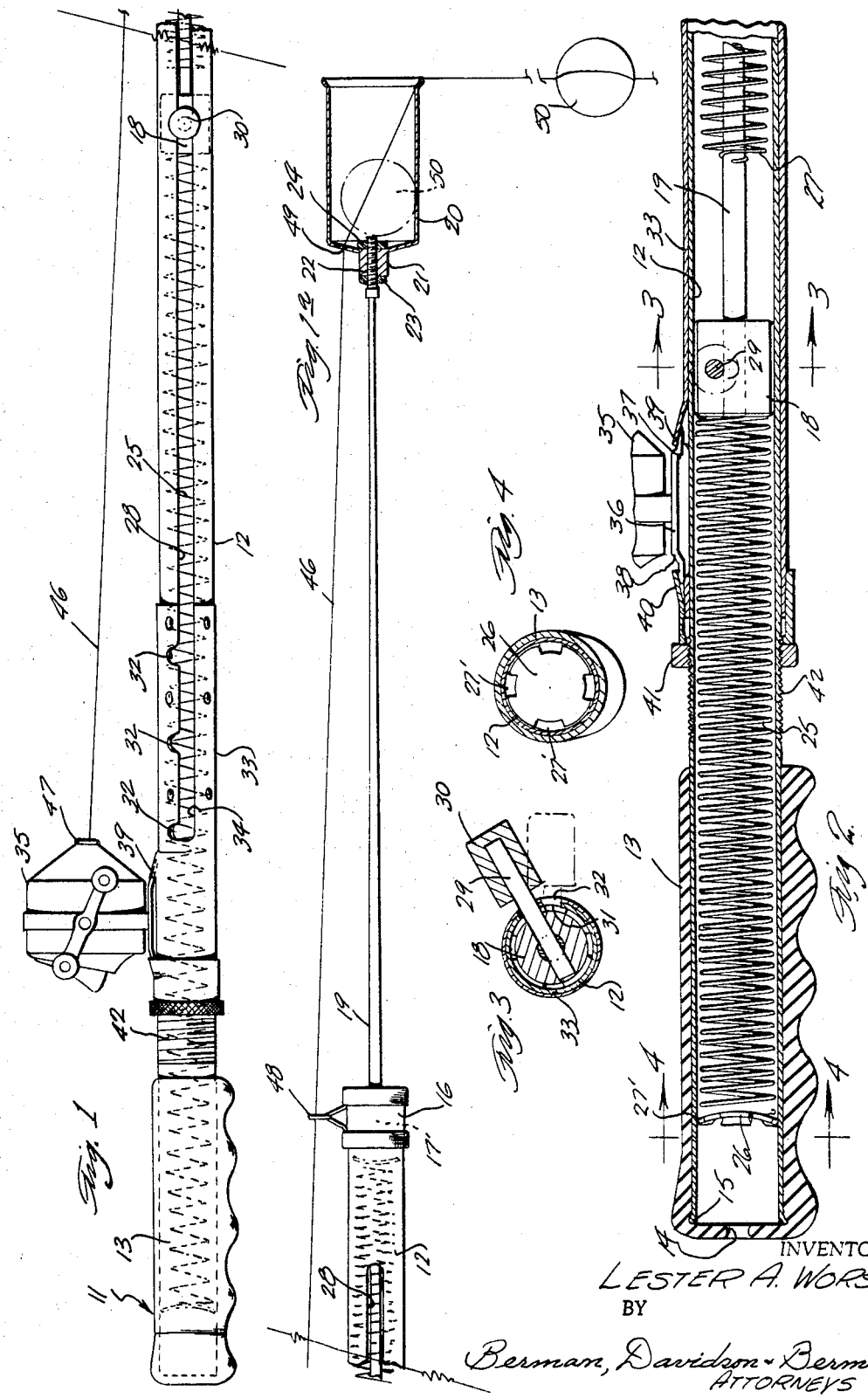
INVENTOR.
LESTER A. WORSHAM
BY
Berman, Davidson - Berman
ATTORNEYS _United States Patent Office_

3,400,480
Patented Sept. 10, 1968

3,400,480
AUTOMATIC FISHING GUN
Lester A. Worsham, Box 559, Cedartown, Ga. 30125
Filed Oct. 22, 1965, Ser. No. 502,212
1 Claim. (Cl. 43—19)

ABSTRACT OF THE DISCLOSURE

A spring-actuated casting rod consisting of a hollow barrel containing a plunger with a spring behind the plunger. A rearwardly concave abutment washer with spaced peripheral anchor lugs is mounted in the barrel behind the spring. A rod is connected to the plunger and has a retaining cup to receive a spherical float member at the end of a fishing line supported on a reel mounted on the barrel. The barrel has a forward abutment sleeve through which the rod slides, and a buffer spring is provided around the rod between the plunger and the abutment sleeve. The fishing line extends slidably through an aperture in the rear wall of the retaining cup. The barrel has a longitudinal slot with spaced notches, and a radial outwardly projecting arm secured to the plunger and is lockingly engageable in a selected one of the notches.

---

This invention relates to fishing rods, and more particularly to a casting rod of the type wherein the fishing line is projected by spring means.

A main object of the invention is to provide a novel and improved spring-actuated casting rod which is relatively simple in construction, which is easy to operate, and which provides accurate casting of the associated fishing line.

A further object of the invention is to provide an improved casting rod of the spring-gun type, the rod being inexpensive to fabricate, being sturdy in construction, and being provided with improved distance-setting means so that the associated fishing line can be projected accurately to points at various known distances.

A still further object of the invention is to provide an improved spring-operated casting rod which is relatively compact in size, which is light in weight, which is smooth in operation, and which employs a minimum number of parts.

Further objects and advantages of the invention will become apparent from the following description and claim, and from the accompanying drawing, wherein:

FIGURE 1 is a side elevational view of the rear portion of an improved spring-operated casting rod constructed in accordance with the present invention.

FIGURE 1a is a side elevational view, partly in longitudinal vertical cross-section, of the forward end portion of the casting rod of FIGURE 1.

FIGURE 2 is a fragmentary enlarged longitudinal vertical cross-sectional view taken through the rear portion of the fishing rod of FIGURE 1.

FIGURE 3 is a transverse vertical cross-sectional view taken substantially on the line 3—3 of FIGURE 2.

FIGURE 4 is a transverse vertical cross-sectional view taken substantially on the line 4—4 of FIGURE 2.

Referring to the drawing, 11 generally designates an improved casting rod constructed in accordance with the present invention. The rod 11 comprises an elongated tubular main barrel portion 12. Mounted on the rear end of the barrel portion 12 is the molded gripping handle 13 which may be of any suitable moldable material, such as plastic or the like, the handle 13 being provided with a central aperture 14 in its rear wall for venting the interior of the barrel 12. The rear end of the barrel 12 is flared slightly, as shown at 15, to provide a secure locking engagement thereof with the rear end portion of the handle 13.

Rigidly secured on the forward end of barrel 12 is a collar or bushing member 16 provided with the axial bore 17. Slidably disposed in the barrel 12 is the generally cylindrical plunger member 18, and secured axially to said plunger member and extending longitudinally through the barrel 12 is the plunger rod 19 which passes slidably through the axial bore 17 of collar member 16.

Secured on the forward end of the rod 19 is a forwardly facing, elongated, generally cylindrical cup member 20, the cup member having an integral end sleeve portion 21 which receives the threaded end portion 22 of rod 19, respective locking nuts 23 and 24 being provided on portion 22 which clampingly engage against the opposite ends of the sleeve member 21, thus rigidly securing the cup 20 to rod 19, as shown in FIGURE 1a.

Designated at 25 is the main propulsion spring of the device, said spring comprising a substantial number of turns of relatively large diameter formed in a coil of relatively stiff spring wire, the spring 25 being disposed in the barrel 12 and having its forward end portion engaged with the plunger member 18 and having its rear end portion secured to an abutment washer 26 mounted in the rear portion of the barrel 12, namely, the portion covered by the handle 13, the abutment washer 26 being located near the apertured end wall of handle 13, as shown in FIGURE 2. Washer 26 is rearwardly concave and is formed with the spaced peripheral locking lugs 27' which are lockingly engaged with the inside surface of barrel 12 and provide a secure anchorage for the washer 26, supporting the washer against the compressional force developed in the spring 25 when the plunger member 18 is retracted.

Surrounding the rod 19 is a snubbing spring 27 which provides a cushioning action between plunger element 18 and the end collar member 16 when the plunger member is projected forwardly upon release of spring 25, thereby preventing plunger member 18 from striking directly against the collar member 16.

The barrel 12 is formed with a longitudinal slot 28. Secured to the plunger member 18 and extending radially outwardly therefrom is a rod-like arm 29 provided on its outer end with a handle or knob 30. The rear end portion of one longitudinal edge of slot 28 is formed with a series of spaced detent notches 31 which register with similar detent notches 32 formed in an outer sleeve member 33 secured on the main barrel 12, said outer sleeve member 33 being provided with a longitudinal slot 34 registering with the slot 28, as shown in FIGURE 1. Thus the plunger member 18 may be locked in the retracted position with the spring 25 under compression by engaging the arm 29 in a selected pair of registering notches 31, 32, in accordance with the desired distance for casting.

Designated at 35 is a conventional reel assembly having a supporting base 36 provided with front and rear downwardly offset supporting feet 37 and 38, the forward supporting foot 37 being engaged beneath an upstruck anchoring lip 39 formed in the outer sleeve 33 and the rear foot 38 being engaged beneath a locking sleeve 40 surrounding the sleeve member 33 and urged forwardly and held in locking engagement with leg 38 by a clamping nut or ring 41 threadedly engaged with external threads 42 formed on the main barrel 12 forwardly adjacent the handle 13.

The fishing line, as shown at 46, extends from the line-guide bushing or collar 47 of the conventional reel assembly 35 and passes through a guide ring 48 mounted on the bushing or collar member 16 provided at the forward end of main barrel 12. The line 46 passes through a guide aperture 49 formed in the rear end wall of cup 20. A generally spherical float 50 is secured to the fishing line 46, and also secured to the fishing line, ahead of float 50, are one or more fishhooks, not shown, accompanied by suitable lures, if so desired. As shown in dotted view in FIGURE 1a, the float member 50 is receivable in the cup 20 when the line 46 is wound up, and the casting rod element 19 may be retracted by winding up the line 46 in the reel 35 until the plunger member 18 has been retracted a substantial distance, after which the plunger 18 may be locked in a desired position of retraction by engaging the arm 29 with one of the pairs of registering locking notches 31, 32, as above-described.

In operation, the plunger member 18 is thus locked in a selected position, depending upon the desired length of the cast. The arm 29 may then be released by rotating same in a clockwise direction, as viewed in FIGURE 3, by means of the knob 30, to disengage the arm 29 from the locking notches 31, 32, thereby allowing the spring 25 to expand which projects the plunger element 18 forwardly with considerable velocity, causing the float 50 with its associated hooks and sinker elements to be projected forwardly, the forward movement of the plunger member 18 being blocked by the resistance provided by the cushioning spring 27 as it is urged against the end collar or bushing 16, the float 50 and associated hooks and sinkers continuing to move forward because of their inertia and traveling through the desired casting distance. The line 46 unwinds from the reel 35 when the cast is made. When it is desired to retract the float 50 and elements attached thereto, the line 46 is wound up by the reel 35 in the usual manner, returning the float 50 into the cup 20 and retracting the rod element 19 in the manner above-described, so that the apparatus may be reset for the next cast.

While a specific embodiment of an improved spring-operated casting rod assembly has been disclosed in the foregoing description, it will be understood that various modifications within the spirit of the invention may occur to those skilled in the art. Therefore, it is intended that no limitations be placed on the invention except as defined by the scope of the appended claim.

What is claimed is:

1. A casting rod assembly comprising an elongated barrel member formed with a longitudinal slot and a plurality of spaced locking notches in a longitudinal edge of the slot, a plunger member slidably mounted in the barrel member, rear abutment means in the rear portion of the barrel member, a coiled propulsion spring in the barrel member between said rear abutment means and the plunger member, a radially projecting arm on the plunger member extending through the slot and being lockingly engageable in a selected one of said locking notches, forward abutment means in the forward end portion of the barrel member limiting forward movement of the plunger member, a rod element secured to said plunger member and extending slidably through said forward abutment means, retaining means secured on the forward end of said rod element, a reel mounted on the barrel member, a line wound on said reel and extending through the retaining means, a spherical float member secured to said line and being receivable in said retaining means, wherein said retaining means comprises a longitudinally elongated, forwardly facing cup having a transverse rear wall, and wherein the line extends slidably through said rear wall, wherein said forward abutment means includes a front bushing secured on the forward end of the barrel member, said bushing having an axial bore slidably receiving the rod element, a coiled cushioning spring surrounding the rod element and being located between said front bushing and the plunger member, and a gripping handle secured on the rear end portion of said barrel member, said gripping handle having a centrally apertured rear end wall, wherein said rear abutment means comprises a rearwardly concave rigid washer element formed with a plurality of spaced peripheral anchoring lugs lockingly engaging the inside surface of the barrel member, whereby the washer may be anchored in a selected longitudinal position in the rear end portion of the barrel member, the rear end of the coiled propulsion spring being secured to said rigid washer element.

References Cited

UNITED STATES PATENTS

| | | | |
|---|---|---|---|
| 179,526 | 7/1876 | Curtiss | 124—27 |
| 764,853 | 7/1904 | Kimberlin | 43—19 |
| 997,730 | 7/1911 | Aten | 43—19 |
| 1,473,507 | 11/1923 | Obermaier | 43—19 |
| 2,217,820 | 10/1940 | Rowe | 43—19 |
| 2,584,678 | 2/1952 | Dewey | 43—19 |
| 2,605,569 | 8/1952 | Kronhaus et al. | 43—19 |
| 2,671,289 | 3/1954 | McCullough | 43—19 |
| 3,279,115 | 10/1966 | Worsham | 43—19 |

WARNER H. CAMP, *Primary Examiner.*